Feb. 24, 1959     J. G. EDELEN, SR     2,874,388
HOLLOW CONTRACTILE AND EXPANSIBLE PIN WITH SEMICLOSED ENDS
Filed Feb. 15, 1957
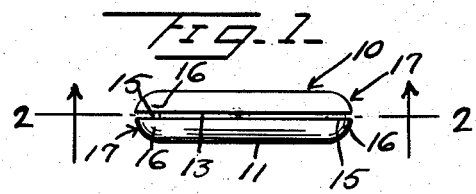
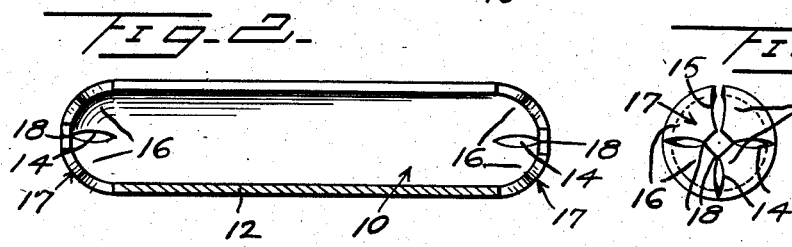
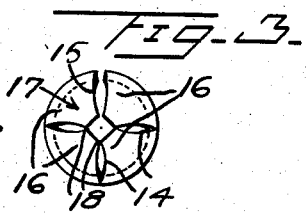
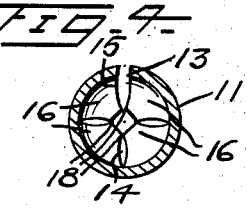
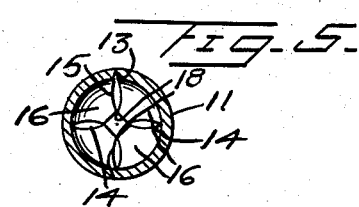
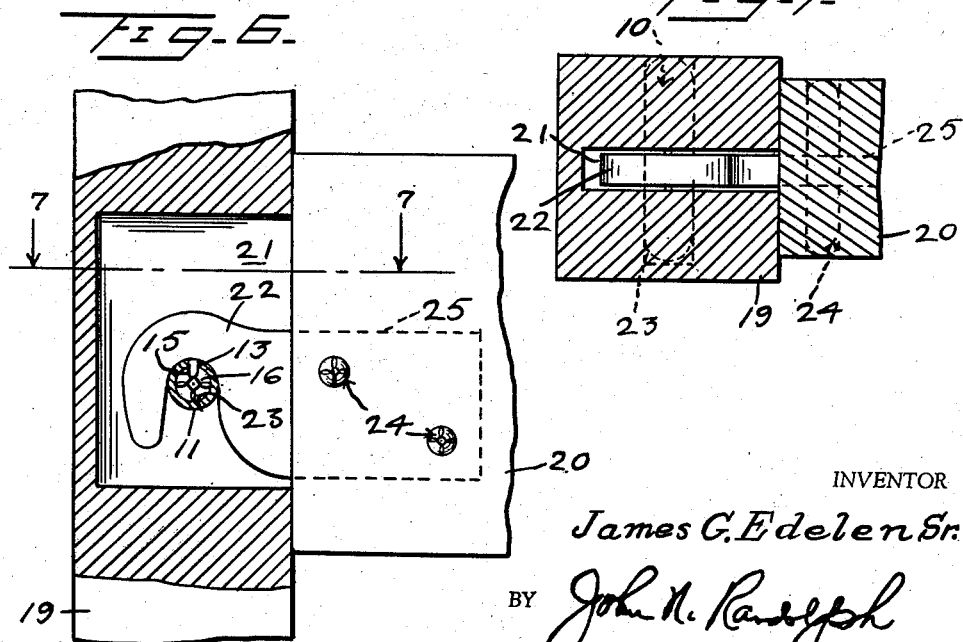
INVENTOR
James G. Edelen Sr.
BY
ATTORNEY

United States Patent Office 2,874,388
Patented Feb. 24, 1959

2,874,388

HOLLOW CONTRACTILE AND EXPANSIBLE PIN WITH SEMICLOSED ENDS

James G. Edelen, Sr., Baltimore, Md.

Application February 15, 1957, Serial No. 640,497

1 Claim. (Cl. 5—303)

This invention relates to a hollow pin which is capable of contracting and expanding to have a tight fitting engagement in a bore or socket and which is so constructed that contraction of the pin will not cause a collapsing thereof.

More particularly, it is a primary object of the present invention to provide a pin primarily adapted to be driven into bores of wooden articles and which can contract to facilitate the driving of the pin into a bore which is slightly undersize relative to the pin, and which pin is capable of expanding to tightly grip a slightly oversized bore.

Still a further object of the invention is to provide such a pin which will effectively function to prevent splitting of the wood while the pin is being driven or as a result of shrinkage of the wood while the pin is applied thereto.

Still another object of the invention is to provide such a pin which is well adapted for use as a "bed pin" to be engaged by hooks which are used to connect bed rails to headboards and footboards and which is of sufficient strength to support the side rails of a bed and the load borne thereby.

Still a further object of the invention is to provide a pin having semiclosed ends which cooperate to effectively prevent collapsing of the pin and to materially increase the load supporting characteristics thereof.

A further object of the invention is to provide a hollow pin through which air can readily escape to facilitate driving of the pin into a blind bore.

Still another object of the invention is to provide a hollow pin which is much lighter in weight and requires substantially less material to produce than a conventional solid metal pin of the same cross sectional size and length.

Various other objects and advantages of the invention will hereinafter become more fully apparent from the following description of the drawing, illustrating a presently preferred embodiment thereof, and wherein:

Figure 1 is a plan or elevational view of the hollow pin;

Figure 2 is an enlarged longitudinal sectional view of the pin, taken substantially along a plane as indicated by the line 2—2 of Figure 1;

Figure 3 is an enlarged end elevational view of the pin;

Figure 4 is an enlarged cross sectional view thereof;

Figure 5 is a cross sectional view similar to Figure 4 but showing the pin as it appears contracted;

Figure 6 is a fragmentary elevational view, partly in section, showing a preferred use of the pins, and Figure 7 is a horizontal sectional view, taken substantially along a plane as indicated by the line 7—7 of Figure 6.

Referring more specifically to the drawing, the hollow pin in its entirety is designated generally 10 and is formed from a single piece of relatively heavy guage sheet metal which is rolled into substantially tubular form to provide the substantially cylindrical body portion 11 of the pin 10, which is of approximately uniform diameter throughout its length. The longitudinal edges of the strip of material 12 from which the pin 10 is formed are normally disposed in slightly spaced apart relation to one another to provide a slot or gap 13 which extends from end-to-end of the body portion 11.

The end portions of the substantially tubular strip 12 are provided with notches 14 and 15, forming four tapered tongues 16 at each end of the pin 10 which are bent inwardly, as seen in Figures 3, 4 and 5. The tongues 16 are bent inwardly so that notches 14 form slits. The notch 15 at each end of the pin 10 forms a flared extension of an end of the slot or gap 13 and when the tongues 16 are bent inwardly it becomes a slit 15 as seen in Figures 3 and 4, which diminishes in width toward the axis of the pin. As seen in Figures 3 and 4, the corners 18 of the blunt radially inner ends of the several tongues 16, forming each pin end 17 and which are located at the inner ends of the slots 14, have abutting engagement with one another. The corners 18 at the inner end of each slot 15 are normally spaced from one another. This constitutes a semiclosed and semirigid construction of the pin ends, which are rounded, as best seen in Figures 1 and 2.

To illustrate a preferred application and use of the pin, a portion of a wooden bed post of either a headboard or footboard of a bed is illustrated in Figs. 6 and 7 and is designated generally 19, and an end portion of a wooden side rail 20 of a bed is also shown. The bed post 19 has a slot 21 formed therein and which is vertically elongated and opens outwardly of an inner side of the bed post to receive a conventional bed hook 22 which is fixed to and projects from the end of the bed rail 20. The bed post 19, as is conventional, is provided with a bore 23 which extends transversely thereof and of the slot 21 and which intersects the slot 21 at a point spaced from the upper and lower ends thereof. A bore 23 may extend completely through the bed post 19, or may be a blind bore, as shown in Figure 7. The bore 23 is provided to receive a "bed pin" which extends across the slot 21 and is adapted to be engaged by the hook 22. However, when conventional solid bed pins are utilized such pins frequently split the bed post when driven into the bore 23 due to the pin being slightly oversized or the bore slightly undersized, or may subsequently split the bed post due to shrinkage of the wood. Likewise, if the pin is undersized or the bore oversized a loose fit results and this may also occur from expansion of the wood. Where such a loose fit exists, the pin frequently works out of the bore and when this occurs and the hook 22 is released, serious damage may be caused to the bed. Also, in driving a tight solid pin into a blind bore, sufficient pressure can be built up by the trapped air to cause a splitting of the bed post.

These several disadvantages are overcome through use of the hollow pin 10. The pin 10 is made slightly oversized in relation to the bore 23. The rounded ends 17 will enable the pin to be readily entered into one end or the open end of the bore 23. The slot 13 will enable the pin body 11 to contract sufficiently to be driven into the bore 23 without risk of splitting the post 19. The pin will be retained in frictional engagement with the wall of the bore 23, due to the tendency of the contracted pin 10 to expand, thus effectively retaining the pin positioned in the bore 23. The hollow interior of the pin 10 and the openings in the ends 17 thereof enable air to escape longitudinally through the pin to prevent an air pressure being built up in a blind bore in front of the pin. The pin 10 will also expand and contract while in an applied position to enable the pin to accommodate itself to variations in size of the bore 23 due to expansion or contraction of the wood of the bed post. When the bed pin is caused to contract the gap or slot 13 thereof is restricted and sufficient contraction will cause the longitudinal edges defining the slot 13 to move into abutting engagement with one another, as seen in Figure 5. This will actually strengthen the pin 10 rather than tending to cause a folding or collapsing thereof. The abutting portions 18 of the tongues 16 make the pin ends 17 semisolid and substantially rigid and effectively function to avoid collapsing or folding of the pin 10 and to provide sufficient rigidity so that the hollow pin is readily capable of supporting the load borne by the hook 22 to support it on the pin, as seen in Figures 6 and 7.

The hollow pin can be made in various sizes both as to length and diameter. Two additional pins 24, of smaller diameter than the pin 10 but of the same construction, are shown extending through the bed rail 20 and through the shank 25 of the hook 22 for anchoring said shank in the bed rail.

Various modifications and changes are contemplated and may be resorted to, without departing from the function or scope of the invention as hereinafter defined by the appended claim.

I claim as my invention:

A hollow contractile and expansible pin formed from a piece of sheet metal having a substantially cylindrical body portion provided with a normally open slot extending from end-to-end thereof, said pin having rounded semiclosed end portions each comprising a plurality of inwardly curved tapered tongues, said tongues having blunt radially inner ends and being of a length such that said inner ends of each end portion are spaced outwardly from the axis of the pin, said radially inner ends having corners, the corners of the tongues of each end portion being disposed in abutting engagement with one another, except adjacent corners of two of the tongues, disposed on opposite sides of the slot, and which are normally spaced from one another to cooperate with the slot to permit contraction of the body portion sufficiently to close the slot and to cause said last mentioned corners to assume positions in abutting engagement with one another to resist collapsing or folding of the pin.

References Cited in the file of this patent

UNITED STATES PATENTS

| | | |
|---|---|---|
| 1,296,342 | Tozzi | Mar. 4, 1919 |
| 1,669,847 | Zimmerman | May 15, 1928 |
| 2,754,716 | Bourns | July 17, 1956 |

FOREIGN PATENTS

| | | |
|---|---|---|
| 486,025 | Canada | Aug. 26, 1952 |
| 521,162 | Great Britain | May 14, 1940 |
| 940,257 | Germany | Feb. 16, 1956 |